(12) United States Patent
Chiang et al.

(10) Patent No.: US 8,803,431 B2
(45) Date of Patent: Aug. 12, 2014

(54) LIGHT EMITTING DIODE LUMINANCE SYSTEM HAVING CLAMPING DEVICE

(71) Applicant: IML International, Grand Cayman, KY (US)

(72) Inventors: Yung-Hsin Chiang, New Taipei (TW); Yi-Mei Li, New Taipei (TW)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 13/737,926

(22) Filed: Jan. 9, 2013

(65) Prior Publication Data

US 2014/0097754 A1 Apr. 10, 2014

(30) Foreign Application Priority Data

Oct. 4, 2012 (TW) .............................. 101136657 A (51) Int. Cl.
*H05B 37/00* (2006.01)
*H05B 39/00* (2006.01)
*H05B 41/00* (2006.01)

(52) U.S. Cl.
USPC ........ 315/192; 315/185 R; 315/193; 315/122; 315/320

(58) Field of Classification Search
USPC ............................... 315/185 R, 186, 192–193
See application file for complete search history.

(56) References Cited

U.S. PATENT DOCUMENTS

2010/0327777 A1* 12/2010 Huang et al. ................... 315/309
2011/0148314 A1 6/2011 Lin
2012/0049741 A1* 3/2012 Ye et al. ......................... 315/122
2012/0062132 A1* 3/2012 Lin et al. ....................... 315/193

FOREIGN PATENT DOCUMENTS

TW 201238392 A1 9/2012

* cited by examiner

*Primary Examiner* — Anh Tran
(74) *Attorney, Agent, or Firm* — Winston Hsu; Scott Margo (57) ABSTRACT

A light emitting diode luminance system includes a first power source, a voltage divider, a first switch, a clamping device, a plurality of current sources and a feedback circuit. The voltage divider is coupled to the first voltage source. The first switch is coupled to the voltage divider and a ground. The clamping device includes a plurality of transistors each coupled to a respective set of light emitting diodes and the voltage divider. The plurality of current sources is coupled to the plurality of transistors respectively. The feedback circuit is coupled to the plurality of transistors and the plurality sets of light emitting diodes.

14 Claims, 6 Drawing Sheets

FIG. 6

LIGHT EMITTING DIODE LUMINANCE SYSTEM HAVING CLAMPING DEVICE

BACKGROUND OF THE INVENTION

1. Field of the Invention

The present invention relates to a light emitting diode luminance system, especially a light emitting diode luminance system capable of providing the short circuit protection function when LEDs thereof are damaged or breakdown.

2. Description of the Prior Art

Figure 1:
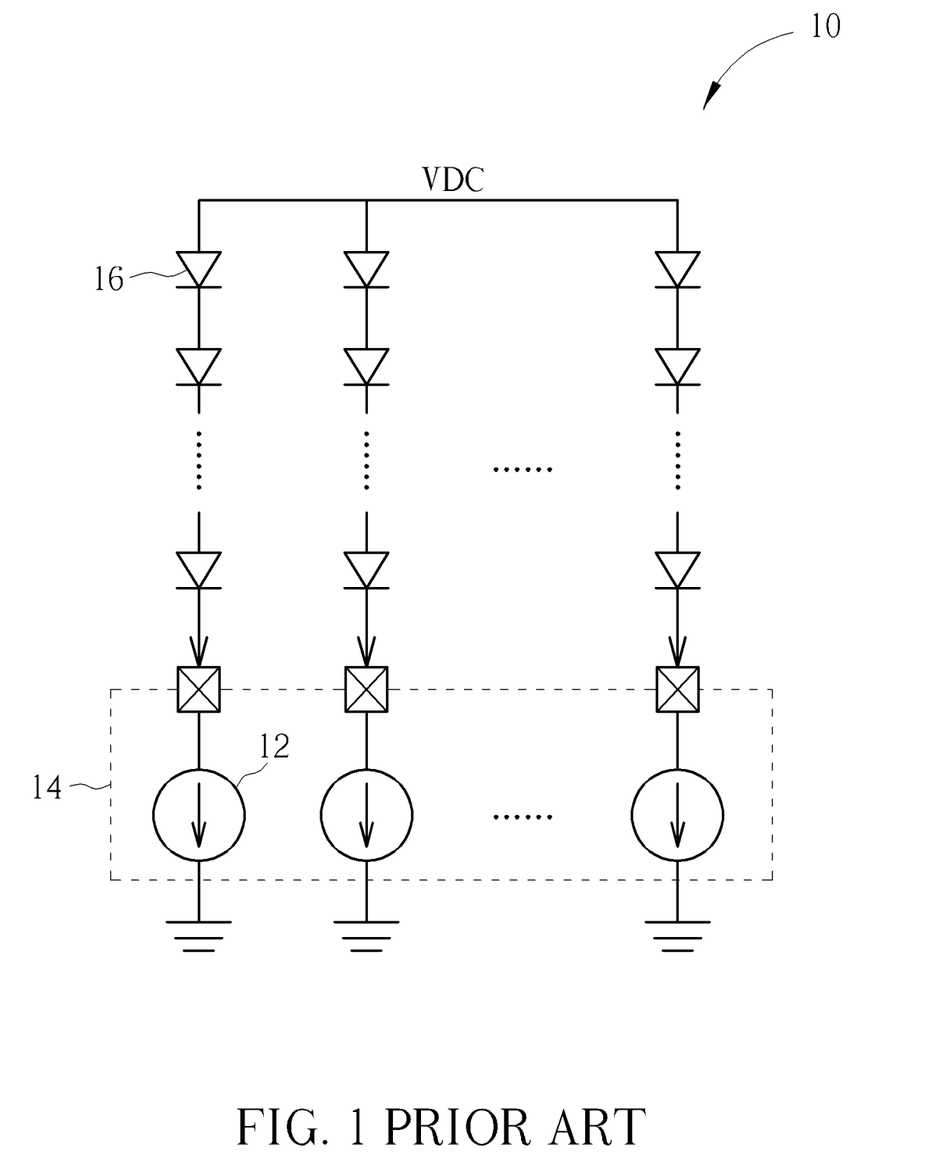
FIG. 1 shows a related art LED luminance circuit comprising LEDs.

Related art light emitting diode (LED) luminance systems usually comprise a plurality of LEDs coupled in series. When the driving voltage varies too rapidly, the LEDs or driving circuit thereof might be damaged. Please refer to FIG. 1, which shows a related art LED luminance circuit 10 comprising a plurality of LEDs 16. As shown in FIG. 1, each string of LEDs has a first end coupled to a voltage source VDC, and a second end coupled to a first end of an integrated circuit (IC) 14. The first end of the IC 14 is coupled to a first end of a current source 12. A second end of the current source 12 is coupled to the ground. When the voltage level of the voltage source VDC rises rapidly and exceeds a rated voltage, the LED luminance circuit 10 will be easily damaged or breakdown. Because the voltage level of the first end of the IC 14 is equal to the voltage level of the voltage source VDC minus the voltage level of all the functional LEDs 16 of a corresponding string of LEDs, the voltage level of the first end of the IC 14 will rise rapidly if some LEDs 16 in the string of LEDs are in breakdown. This may reduce the life span of the IC 14. And if the voltage level of the first end of the IC 14 rises to a high level exceeding a tolerance of the IC 14, the IC 14 maybe breakdown accordingly. To avoid the above issue, the IC 14 should be manufactured with high voltage process. However, in this way, the IC will be designed to have a larger area, and the cost will accordingly become higher.

SUMMARY OF THE INVENTION

An embodiment of the present invention relates to a light emitting diode luminance system includes a first power source, a voltage divider, a first switch, a clamping device, a plurality of current sources and a feedback circuit. The first power source is used for providing a first voltage. The voltage divider is coupled to the first voltage source. The first switch is coupled to the voltage divider and a ground. The clamping device comprises a plurality of transistors, each transistor of the plurality of transistors having a first end respectively coupled to a second end of each of a plurality sets of light emitting diodes, a control end coupled to the voltage divider, and a second end. The plurality of current sources is respectively coupled to the second end of each of the plurality of transistors. The feedback circuit is coupled to the second end of each of the plurality of transistors, and coupled to a first end of each of the plurality sets of light emitting diodes.

Another embodiment of the present invention relates to a method of controlling a light emitting diode luminance system. The light emitting diode luminance system comprises a first power source, a voltage divider, a first switch, a clamping device, a plurality of current sources and a feedback circuit. The first power source is used for providing a first voltage. The voltage divider is coupled to the first voltage source. The first switch is coupled to the voltage divider and a ground. The clamping device comprises a plurality of transistors, each transistor of the plurality of transistors having a first end respectively coupled to a second end of each of a plurality sets of light emitting diodes, a control end coupled to the voltage divider, and a second end. The plurality of current sources is respectively coupled to the second end of each of the plurality of transistors. The feedback circuit is coupled to the second end of each of the plurality of transistors and coupled to a first end of each of the plurality sets of light emitting diodes. The method comprises turning on the first switch for the voltage divider outputting a divided voltage to the control end of each of the transistors, turning off the first switch, and enabling the short circuit protection controller for detecting a voltage level of the second end each of the transistors. A period of the short circuit protection controller being enabled and a period of the first switch being turned off are at least partially overlapped.

These and other objectives of the present invention will no doubt become obvious to those of ordinary skill in the art after reading the following detailed description of the preferred embodiment that is illustrated in the various figures and drawings.

DETAILED DESCRIPTION

Some phrases are referred to specific elements in the present specification and claims, please notice that the manufacturer might use different terms to refer to the same elements. However, the definition between elements is based on their functions instead of their names. Further, in the present specification and claims, the term "comprising" is open type and should not be viewed as the term "consisted of." Besides, the term "couple" can be referred to either directly connecting or indirectly connecting between elements.

The embodiments and figures are provided as follows in order to illustrate the present invention in detail, but please notice that the claimed scope of the present invention is not limited by the provided embodiments and figures.

Figure 2:
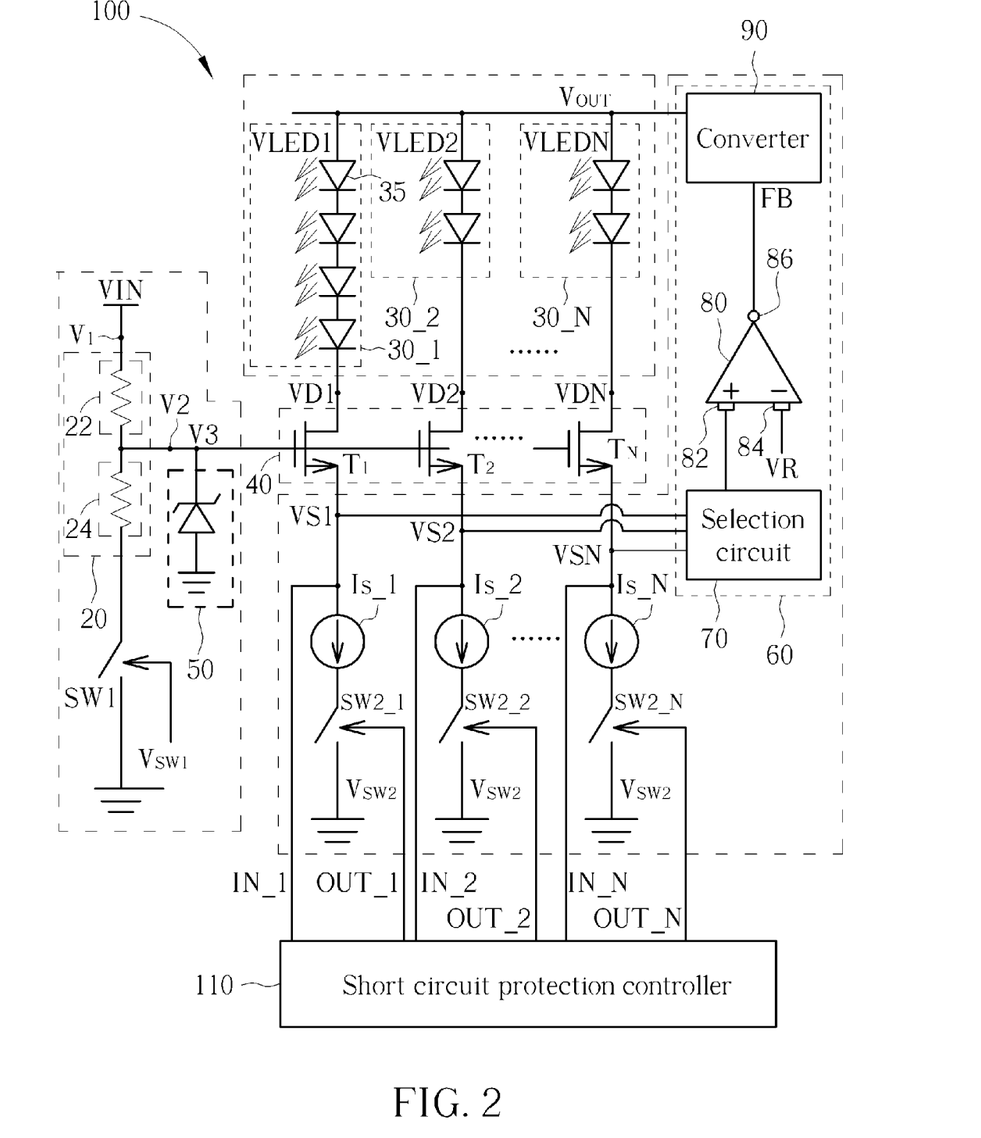
FIG. 2 shows an LED luminance system of the present invention.

Please refer to FIG. 2, which shows an LED luminance system 100 of the present invention. The LED luminance system includes a first power source VIN, a voltage divider 20, a first switch SW1, a plurality of LED strings 30_1 to 30_N, a clamping device 40, a clamping circuit 50, a plurality of current sources Is_1 to Is_N, a feedback circuit 60 and a plurality of second switches SW2_1 to SW2_N. The first power source VIN is used for providing a first voltage V1. The voltage divider 20 is coupled to the first voltage source VIN. The first switch SW1 is coupled to the voltage divider 20 and the ground. Each of the LED strings 30_1 to 30_N comprise a plurality of serially connected LEDs 35. The clamping device 40 comprises a plurality of transistors T1 to TN. The control ends of the transistors T1 to TN are coupled to the voltage divider 20. The clamping circuit 50 is coupled to the control ends of the transistors T1 to TN and the ground. The feedback circuit 60 is coupled to the second ends of the transistors T1 to TN, and coupled to the first ends of the LED strings 30_1 to 30_N. Although some elements in this and following embodiments are coupled to the ground, the present invention may comprise the configuration of coupling those elements to a relatively low voltage end (compared with the first voltage V1) or to a negative voltage end instead of the ground.

The feedback circuit 60 comprises a selection circuit 70, a comparator 80 and a converter 90. The selection circuit 70 is coupled to the second ends of the transistors T1 to TN, for outputting a smallest voltage among voltages of each of the second end of the transistors T1 to TN.

The comparator 80 comprises a positive end 82, a negative end 84 and an output end 86. The positive input end 82 is coupled to the selection circuit 70. The negative input end 84 is used for receiving a reference voltage VR. The output end 86 is used for outputting a comparison signal FB according to a voltage level outputted from the selection circuit 70 and the reference voltage VR. The converter 90 is coupled to the first end of the LED strings 30_1 to 30_N and the output end 86 of the comparator 80, for adjusting voltage level to be outputted to the LED strings 30_1 to 30_N according to the comparison signal FB.

The second switches SW2_1 to SW2_N are respectively coupled to the current sources Is_1 to Is_N for controlling on and off of the current sources Is_1 to Is_N. The short circuit protection controller 110 comprises a plurality of input ends IN_1 to IN_N and output ends OUT_1 to OUT_N. The input ends IN_1 to IN_N are respectively coupled to the second ends of the transistors T1 to TN. The output ends OUT_1 to OUT_N are respectively coupled to the control ends of the second switches SW2_1 to SW2_N, for turning on and off the second switches SW2_1 to SW2_N according to a voltage level of the second ends of the transistors T1 to TN or dimming signals. The dimming signal is a signal capable of substantially turning on and off the second switches SW2_1 to SW2_N, that is, controlling on and off of the current sources Is_1 to Is_N. The luminance of the LED strings 30_1 to 30_N can be adjusted according to the duty cycles of the second switches SW2_1 to SW2_N.

The voltage divider 20 comprises a first impedance 22 and a second impedance 24. The first impedance 22 is coupled to the first voltage source VIN, and the second impedance 24 is coupled between the first impedance 22 and ground.

In the present embodiment, the clamping circuit 50 comprises a zener diode, which includes a cathode coupled to the control ends of the transistors T1 to TN, and an anode coupled to the ground. However, the present invention is not limited by the above configuration. The clamping circuit 50 of the present invention can also be configured to comprise other elements.

Figure 3:
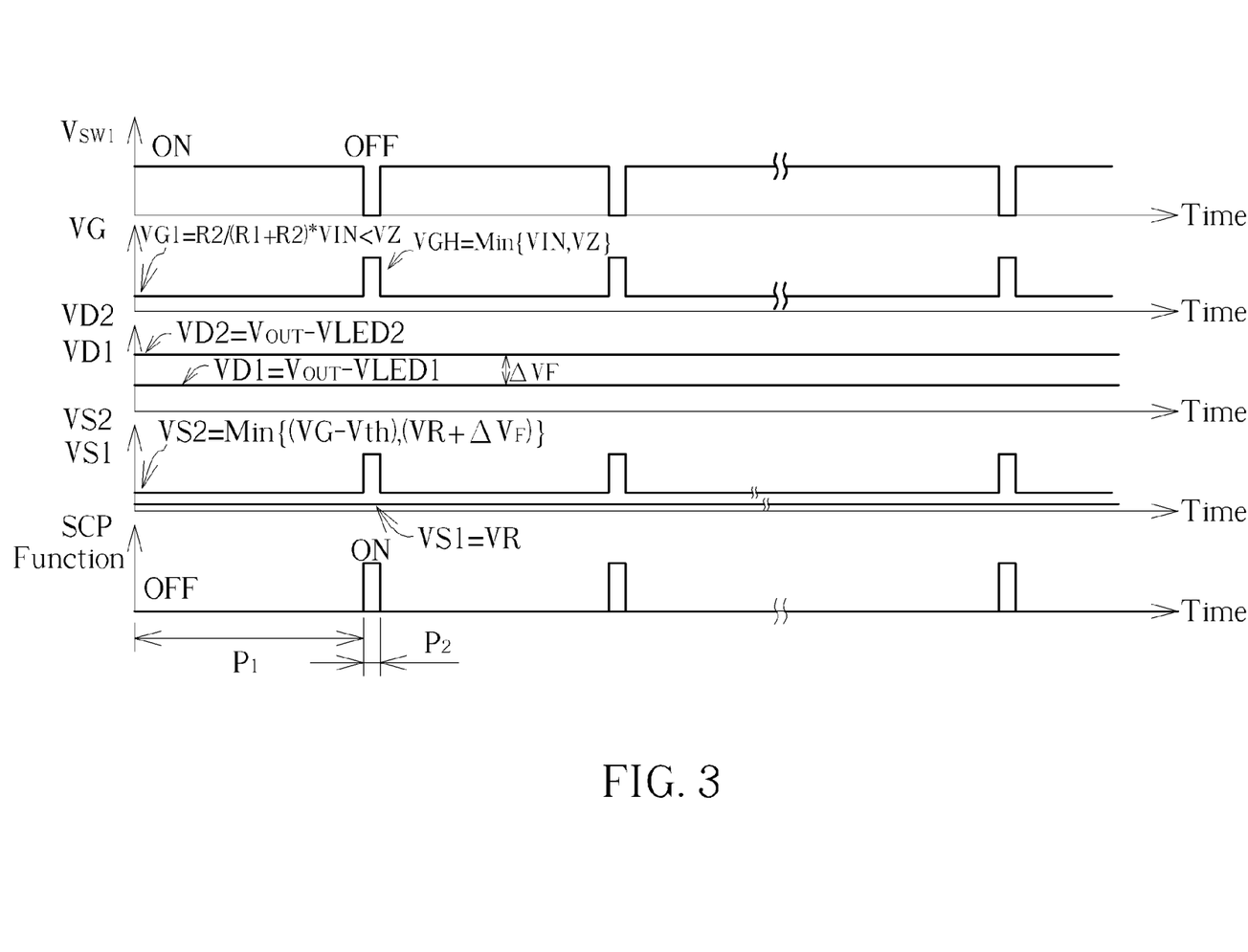
FIG. 3 shows a timing diagram of controlling the LED luminance system in FIG. 2 according to a first embodiment of the present invention.
Figure 4:
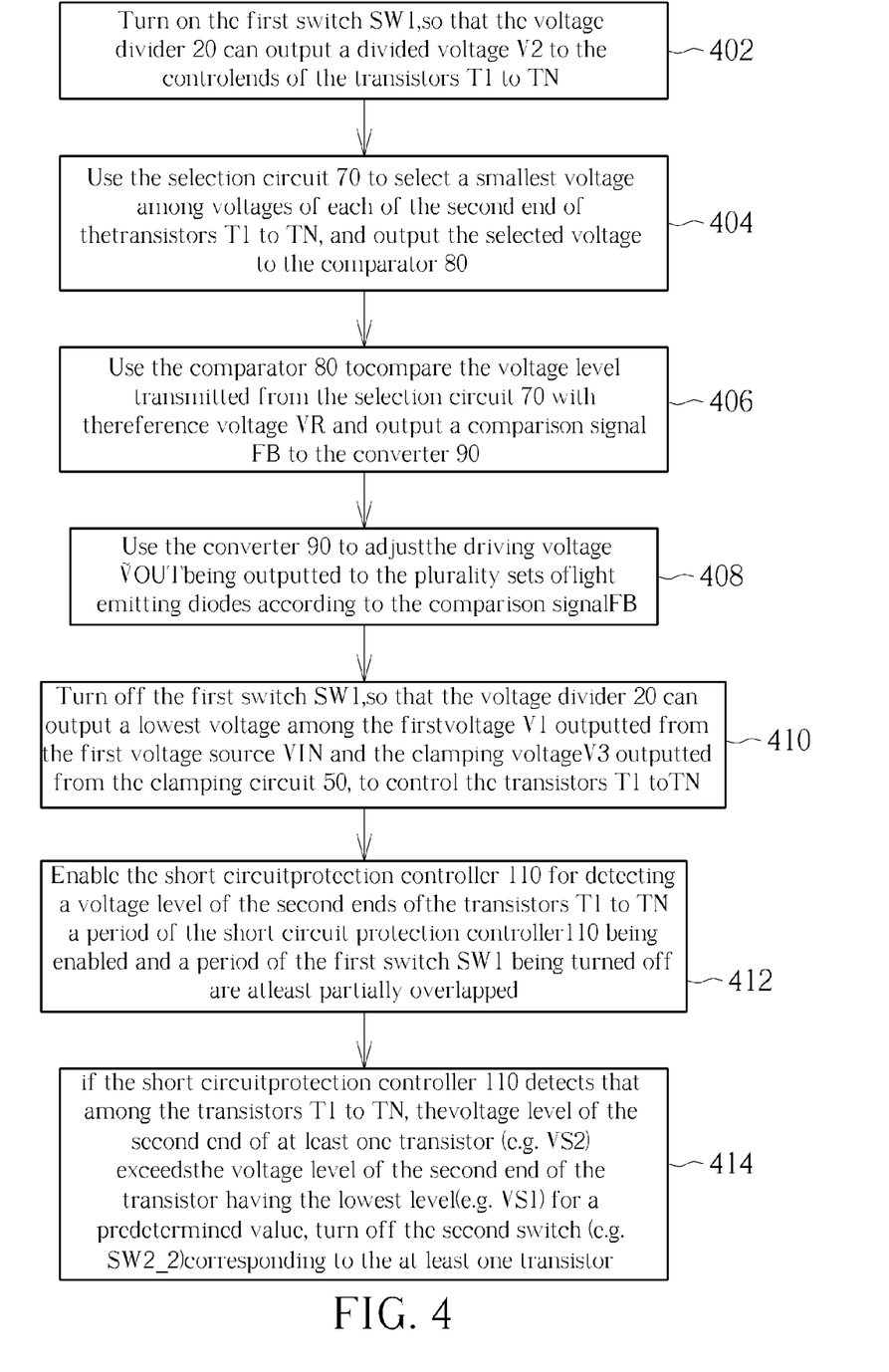
FIG. 4 is a flowchart of controlling the LED luminance system in FIG. 2 according to the first embodiment of the present invention.

Please refer to FIGS. 3 and 4. FIG. 3 shows a timing diagram of controlling the LED luminance system 100 in FIG. 2 according to a first embodiment of the present invention. In FIG. 3, the voltage level $V_{SW1}$ at the control end of the first switch SW1, the voltage level VG at the control ends of the transistors T1 to TN, the voltage level VD2 at the first end of the transistor T2, the voltage level VD1 at the first end of the transistor T1, the voltage level VS2 at the second end of the transistor T2, the voltage level VS1 at the second end of the transistor T1, and the waveform varied with time of the LED luminance system 100 performing the short circuit protection (SCP) function are shown from top to bottom. FIG. 4 is a flowchart of controlling the LED luminance system 100 in FIG. 2 according to the first embodiment of the present invention, and the descriptions of FIG. 4 are as follows.

Step 402: turn on the first switch SW1, so that the voltage divider 20 can output a divided voltage V2 to the control ends of the transistors T1 to TN;

Step 404: use the selection circuit 70 to select a smallest voltage among voltages of each of the second end of the transistors T1 to TN, and output the selected voltage to the comparator 80;

Step 406: use the comparator 80 to compare the voltage level transmitted from the selection circuit 70 with the reference voltage VR and output a comparison signal FB to the converter 90;

Step 408: use the converter 90 to adjust the driving voltage $V_{OUT}$ being outputted to the plurality sets of light emitting diodes according to the comparison signal FB;

Step 410: turn off the first switch SW1, so that the voltage divider 20 can output a lowest voltage among the first voltage V1 outputted from the first voltage source VIN and the clamping voltage V3 outputted from the clamping circuit 50, to control the transistors T1 to TN;

Step 412: enable the short circuit protection controller 110 for detecting a voltage level of the second ends of the transistors T1 to TN; a period of the short circuit protection controller 110 being enabled and a period of the first switch SW1 being turned off are at least partially overlapped;

Step 414: if the short circuit protection controller 110 detects that among the transistors T1 to TN, the voltage level of the second end of at least one transistor (e.g. VS2) exceeds the voltage level of the second end of the transistor having the lowest level (e.g. VS1) for a predetermined value, turn off the second switch (e.g. SW2_2) corresponding to the at least one transistor.

When the first switch SW1 is turned on, the voltage divider 20 will output a divided voltage V2, and the amount of the divided voltage V2 can be determined according to the values of the first impedance 22, the second impedance 24 and the first voltage V1 outputted from the first voltage source VIN, e.g. V2=(R2/(R1+R2))×V1. In step 402, when the first switch SW1 is turned on, the divided voltage V2 transmitted to the transistors T1 to TN will be smaller due to the voltage level VD2 at the first end of the transistor T2 equal to the driving voltage $V_{OUT}$ minus the across voltage VLED2, and the voltage level VD1 at the first end of the transistor T1 equal to the driving voltage $V_{OUT}$ minus the across voltage VLED1. The across voltage VLED2 is the sum of the voltage level of all the functional LEDs 35 in the LED string 30_2, and the across voltage VLED1 is the sum of the voltage level of all the functional LEDs 35 in the LED string 30_1. Therefore, it can be seen that when the transistors T1 and T2 are turned on, the voltage level VS1 at the second end of the transistor T1 will be smaller than the voltage level VS2 at the second end of the transistor T2. In Step 404, the selection circuit 70 will select a smallest voltage among voltages of the second ends of the transistors T1 to TN, and output the selected smallest voltage to the positive input end 82 of the comparator 80. Thus, the voltage level VS1 at the second end of the transistor T1 will be selected to be compared with the reference voltage VR at the negative input end 84 in Step 406, to output the comparison signal FB from the output end 86 to the converter 90. In Step 408, the converter 90 will adjust the duty cycle according to the received comparison signal FB. When the comparison signal FB is judged as too large, e.g. the voltage level VS1 at the first end of the transistor T1 is larger than the reference voltage VR, the duty cycle will be reduced. Otherwise, if the voltage level VS1 is smaller than the reference voltage VR, the duty cycle will be raised. Through the converter 90 outputting the driving voltage $V_{OUT}$, the voltage level VS1 of the second end of the transistor T1 can be kept at a fixed level (e.g. VR). In Step 412, the short circuit protecting function is performed to protect the LED luminance system 100. When the short circuit protection controller 110 is enabled, the first switch SW1 will be turned off, and then the divided voltage V2 will be raised. However, the voltage levels received by the control ends of the transistors T1 to TN will be limited by the clamping voltage V3 of the clamping circuit 50. Thus, even if the voltage level of the divided voltage outputted by the voltage divider 209 is larger than the voltage level of the clamping voltage V3, the voltage levels at the control ends of the transistors T1 to TN will not exceed the voltage level of the clamping voltage V3, but will be limited within the voltage level of the clamping voltage V3, that is, VG≤V3. In this way, the situation that when the divided voltage V2 is too large resulting in the voltage levels at the control ends of the transistors T1 to TN too high can be avoided. Therefore, the transistors T1 to TN will not be damaged. Please notice that in the present invention, the short circuit protection controller 110 may be configured to comprise a dimming function other than the short circuit protecting function. That is, the functions of the short circuit protection controller 110 are not limited by the name thereof. For example, the short circuit protection controller 110 can turn on and off the second switches SW2_1 to SW2_N with various frequencies/duty cycles, so as to adjust the luminance of each string of the LED strings 30_1 to 30_N. Thus, the string of the LED strings 30_1 to 30_N can generate light with various luminance accordingly.

In the present embodiment, the number of LEDs 35 in the LED string 30_2 is fewer than the number of those in the LED string 30_1 for showing the scenario that all of the LEDs 35 in the LED string 30_1 are functional while some of the LEDs 35 in the LED string 30_2 are damaged. However, the number of the LEDs 35 depicted in FIG. 2 is not used to limit the configuration of the LED strings 30_1 to 30_N.

When enabling the short circuit protection controller 110 in Step 412, because the input ends IN_1 to IN_N of the short circuit protection controller 110 are respectively coupled to the second ends of the transistors T1 to TN, the voltage levels at the second ends of the transistors T1 to TN can be detected accordingly. Because all of the LEDs in the LED string 30_1 are functional and some of the LEDs in the LED string 30_2 are damaged, the voltage level of the second end of the transistor T2 will be detected to be larger than the voltage level of the second end of the transistor T1 by the short circuit protection controller 110, thus the situation that some LEDs in the LED string 30_2 are damaged causing the short circuit effect can be known.

In Step 414, the voltage levels of the second ends of the transistors T1 to TN can be detected by the short circuit protection controller 110, thus the LED strings having damaged LEDs can be detected. Besides, since the output ends OUT_1 to OUT_N of the short circuit protection controller 110 are respectively coupled to the control ends of the second switches SW2_1 to SW2_N, the short circuit protection controller 110 can control on and off of the second switches SW2_1 to SW2_N according to the detected voltage levels of the second ends of the transistors T1 to TN, to provide the short circuit protection. Similarly, when more LED strings are detected in the LED strings 30_1 to 30_N, the corresponding second switches will be turned off to provide the short circuit protection. In this embodiment, the time of the short circuit protection controller 110 being enabled and the time of first switch SW1 being turned off should fully or partially overlapped.

Further, in the period P1, because the first switch SW1 is turned on, the voltage level VG at the control ends of the transistors T1 to TN will be equal to V2, and V2=(R2/(R1+R2))×V1, the voltage level VS2 at the second end of the transistor T2 will be equal to the voltage level VG at the control end of the transistor T2 minus the threshold voltage Vth of the transistor T2, the voltage level VD1 at the first end of the transistor T1 will be equal to the driving voltage $V_{OUT}$ minus the across voltage VLED1 of the LED string 30_1, and the voltage level VD2 at the first end of the transistor T2 will be the voltage level of the driving voltage $V_{OUT}$ minus the across voltage of the functional LEDs in the LED string 30_2. In the period P2, the first switch SW1 is turned off, thus the voltage level VG will be the lowest voltage of the first voltage V1 outputted from the first voltage source VIN and the clamping device V3. The voltage level at the second end of the transistor T2 is as follows:

when VG−Vth<VD2, VS2=VG−Vth;
when VG−Vth>VD2, VS2=VS1+ΔVF=VR+ΔVF.

Because the second switches SW2_1 to SW2_N are all on in both the periods P1 and P2, and the voltage level VS1 at the second end of the first transistor T1 is outputted to the positive end 82 of the comparator 80, the voltage level VS1 will approximately be the voltage level of the reference voltage VR, and the voltage level VS2 at the second end of the transistor T2 will approximately be (VG−Vth) or (VR+ΔVF). ΔVF denotes the voltage difference of the voltages levels VD1 and VD2. Thus, the time of the short circuit protection controller 110 being enabled and the period P2 have to be at least partially overlapped, so that the difference between the voltage level of the second end of the transistor T1 and the voltage level of the second end of the transistor T2 can be measured to determine whether there are short circuited LEDs.

In general, since the number of the damaged LEDs 35 can not be estimated in advance, it can not be predicted that if (VG−Vth) is larger or smaller than VD2. In this embodiment of the present invention, when there are only few short circuited LEDs in an LED string, the difference of the voltages levels VD1 and VD2 will be smaller, and the voltage level VS2 will be also smaller, thus (VG−Vth) will usually be larger than VD2, and VS2=VS1+ΔVF=VR+ΔVF. On the contrary, if there are too many short circuited LEDs in a LED string, the difference of the voltages levels VD1 and VD2 is larger, and the voltage level VD2 is also larger, thus (VG−Vth) will usually be smaller than VD2, and VS2 will be clamped at (VG−Vth). Therefore, when the short circuit protecting function is performed for the LED string 30_2 having short circuit LEDs, the voltage level VS2 at the second end of the transistor T2 will be clamped at (VG−Vth). Besides, by selecting appropriate VG, V1 and V3, and considering the voltage durability of the current sources Is_1 to Is_N, the high voltage gate clamping effect can be reached, thus the current sources Is_1 to Is_N can be manufactured with low voltage process. When performing the short circuit protecting function, though the voltage level VD2 might be high, the voltage level VS2 will be clamped at (VG−Vth), and the high voltage is endured by the transistor T2. That is the function provided by the transistor T2.

One of the technical features of the present invention is to focus on how to control the transistors to both clamp voltages and perform the short circuit protection function.

Figure 5:
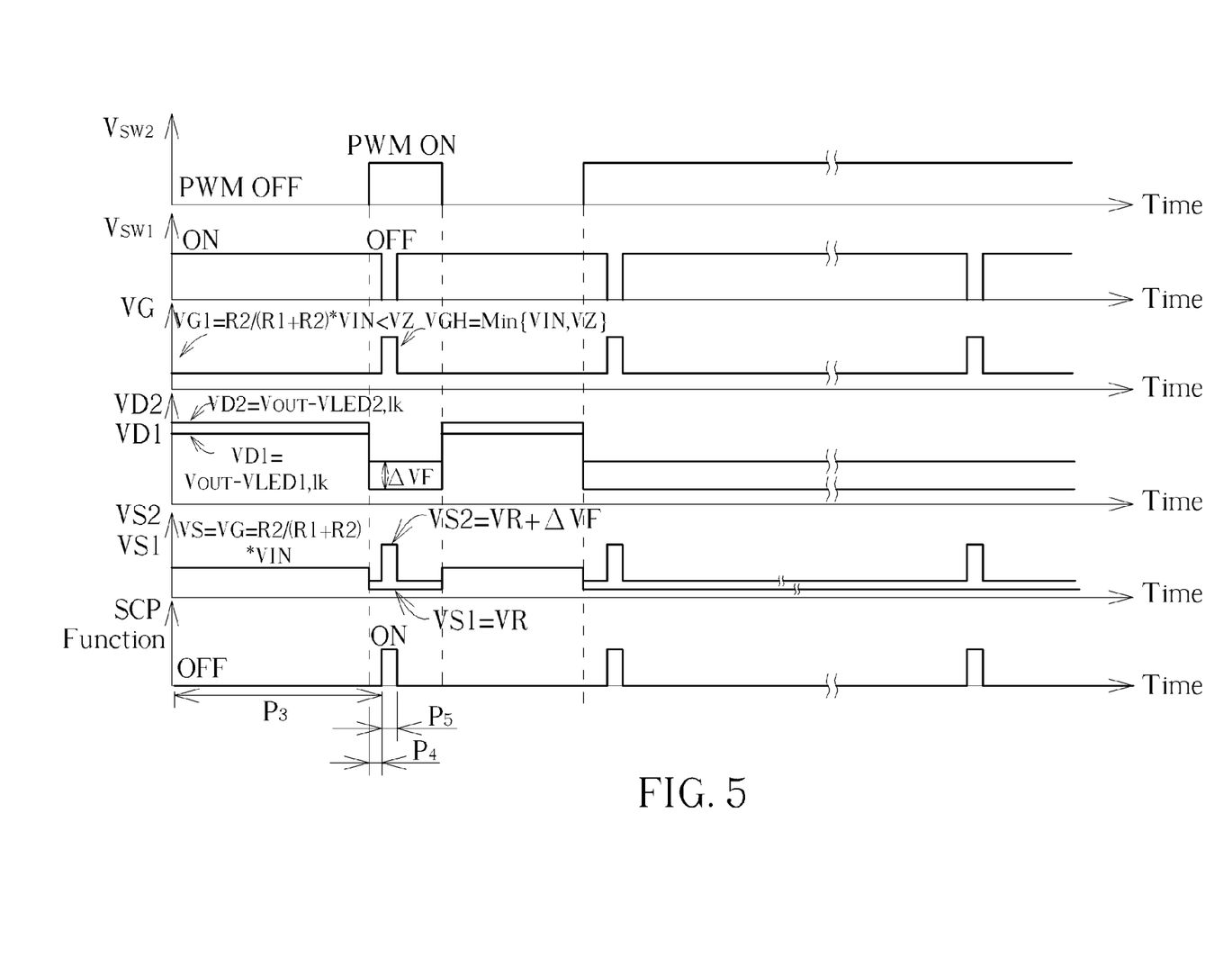
FIG. 5 shows a timing diagram of controlling the LED luminance system in FIG. 2 according to a second embodiment of the present invention.
Figure 6:
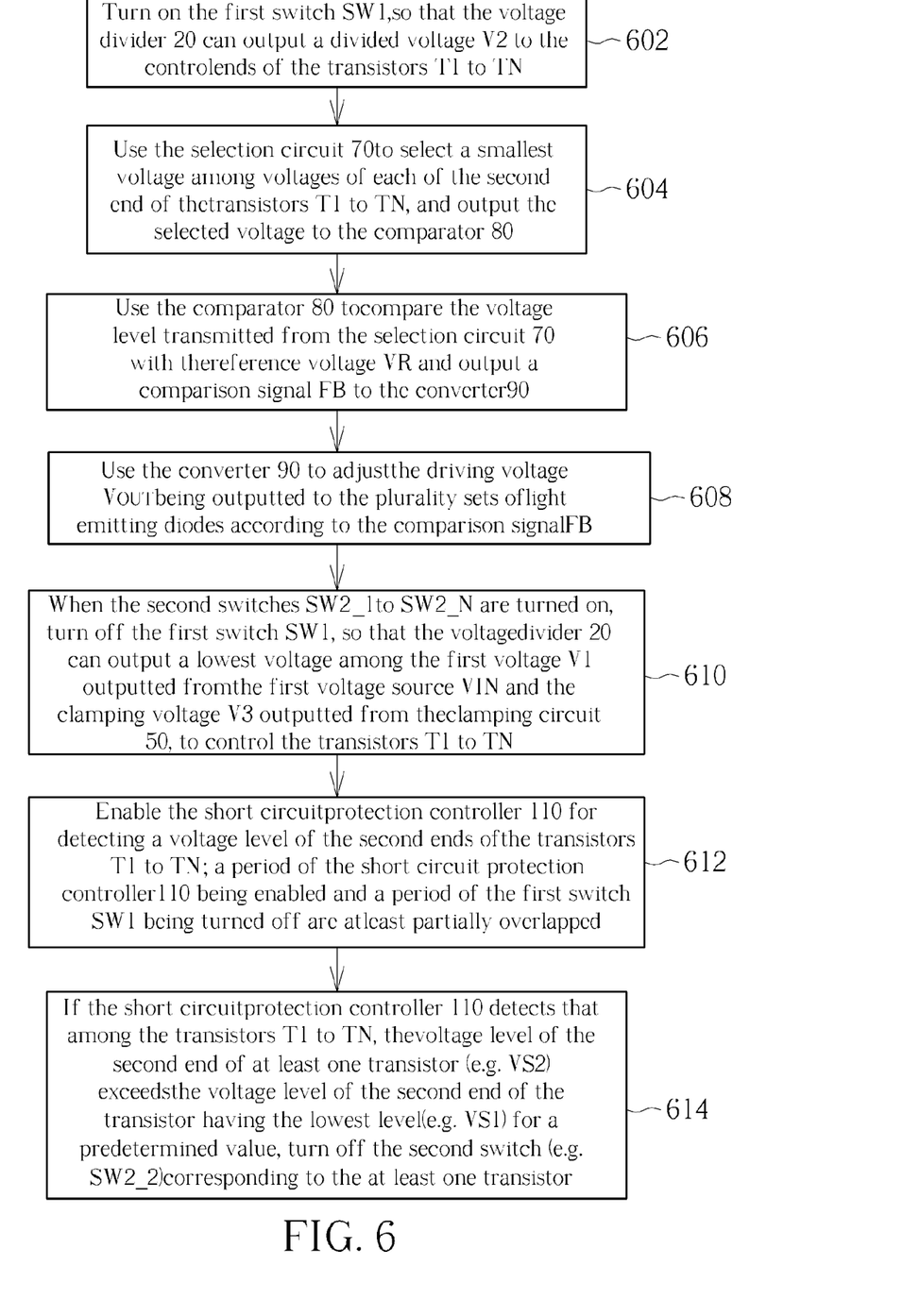
FIG. 6 is a flowchart of controlling the LED luminance system in FIG. 2 according to a second embodiment of the present invention.

Please refer to FIGS. 5 and 6. FIG. 5 shows a timing diagram of controlling the LED luminance system 100 in FIG. 2 according to a second embodiment of the present invention. In FIG. 5, the voltage level $V_{SW2}$ at the control ends of the second switches SW2_1 to SW2_N, the voltage level $V_{SW1}$ at the control end of the first switch SW1, the voltage level VG at the control ends of the transistors T1 to TN, the voltage level VD2 at the first end of the transistor T2, the voltage level VD1 at the first end of the transistor T1, the voltage level VS2 at the second end of the transistor T2, the voltage level VS1 at the second end of the transistor T1, and the waveform varied with time of the LED luminance system 100 performing the short circuit protection (SCP) function are shown from top to bottom. FIG. 6 is a flowchart of controlling the LED luminance system 100 in FIG. 2 according to a second embodiment of the present invention, and the descriptions of FIG. 6 are as follows.

Step 602: turn on the first switch SW1, so that the voltage divider 20 can output a divided voltage V2 to the control ends of the transistors T1 to TN;

Step 604: use the selection circuit 70 to select a smallest voltage among voltages of each of the second end of the transistors T1 to TN, and output the selected voltage to the comparator 80;

Step 606: use the comparator 80 to compare the voltage level transmitted from the selection circuit 70 with the reference voltage VR and output a comparison signal FB to the converter 90;

Step 608: use the converter 90 to adjust the driving voltage $V_{OUT}$ being outputted to the plurality sets of light emitting diodes according to the comparison signal FB;

Step 610: when the second switches SW2_1 to SW2_N are turned on, turn off the first switch SW1, so that the voltage divider 20 can output a lowest voltage among the first voltage V1 outputted from the first voltage source VIN and the clamping voltage V3 outputted from the clamping circuit 50, to control the transistors T1 to TN;

Step 612: enable the short circuit protection controller 110 for detecting a voltage level of the second ends of the transistors T1 to TN; a period of the short circuit protection controller 110 being enabled and a period of the first switch SW1 being turned off are at least partially overlapped;

Step 614: if the short circuit protection controller 110 detects that among the transistors T1 to TN, the voltage level of the second end of at least one transistor (e.g. VS2) exceeds the voltage level of the second end of the transistor having the lowest level (e.g. VS1) for a predetermined value, turnoff the second switch (e.g. SW2_2) corresponding to the at least one transistor. In the period P3, because the first switch SW1 is turned on, the voltage level VG at the control ends of the transistors T1 to TN will be equal to V2, V2=(R2/(R1+R2))× V1, and the second switches SW2_1 to SW2_N are off. Thus, both the voltage level VS1, VS2 of the transistors T1, T2 will be equal to the voltage level VG. At this time, the voltage level VS1 is not needed to be equal to the reference voltage VR, because the LED luminance system 100 does not output current and is at a no loading state. Besides, the driving voltage $V_{OUT}$ is kept by large capacitance, so that no current flows through the LED strings 30_1 to 30_N. Thus, when the across voltage of the LED strings 30_1 to 30_N reduces rapidly, the source voltages VS1 to VSN of the transistors T1 to TN will rise, but at most to the voltage level of VG, so that the voltage level of the source end will not exceed the voltage level of the gate end. Though there is no current flowing through the LED strings 30_1 to 30_N, small across voltage VLED1_LK, VLED2_LK will still be generated on the LED strings 30_1, 30_2 due to the leakage current. Thus the voltage level VD1 at the first end of the transistor T1 is equal to $V_{OUT}$-VLED1_LK, which is close to $V_{OUT}$, and the voltage level VD2 at the first end of the transistor T2 is equal to $V_{OUT}$-VLED2_LK, which is also close to $V_{OUT}$.

In the period P4, the second switches SW2_1 to SW2_N are turned on, thus the voltage level VS1 at the second end of the transistor T1 will substantially be the voltage level of the reference voltage VR, and the voltage level VS2 at the second end of the transistor T2 will substantially be the voltage level VG at the control end of the transistor T2 minus the threshold voltage Vth of the transistor T2. The voltage level VD1 at the first end of the transistor T1 will be reduced from a level close to $V_{OUT}$ to $V_{OUT}$-VLED1, and the voltage level VD2 at the first end of the transistor T2 will be reduced from a level close to $V_{OUT}$ to $V_{OUT}$-VLED2.

In the period P5, because the second switches SW2_1 to SW2_N are still on and the first switch SW1 is turned off, the voltage level VG at the control ends of the transistors T1 to TN will be the voltage level of the lowest voltage among the first voltage V1 outputted from the first voltage source VIN and the clamping voltage V3 outputted from the clamping circuit 50, the voltage level VS1 at the second end of the transistor T1 will substantially be the voltage level of the reference voltage VR, and the voltage level VS2 at the second end of the transistor T2 will substantially be VR+ΔVF (ΔVF denotes the voltage difference of the voltages levels VD1 and VD2). Therefore, the time of enabling the SCP function of the LED luminance system 100 and the period P5 have to be at least partially overlapped, so that the difference between the voltage level of the second end of the transistor T1 and the voltage level of the second end of the transistor T2 can be measured to determine if there are short circuited LEDs.

The periods P4 and P5 in FIG. 5 are used to provide similar functions as the function provided by the periods P1 and P2 in FIG. 3. The difference between the two embodiments is that in the period P3, the LED luminance system 100 is at a dimming state, and no current flows through the LEDs 35, thus the LEDs 35 will not emit light. In the periods P4 and P5, the LEDs 35 will emit light due to current flowing through the LEDs 35. However, the SCP function is enabled during the period P5, not the period P4. Besides, the second switches SW2_1 to SW2_N can be further used for dimming, and the way of dimming can be utilizing the ratio of on and off of the LEDs 35, to generate an average current or an average luminance. Thus, the SCP function will periodically detect the function of LED luminance system 100 when the LEDs second switches SW2_1 to SW2_N are turned on.

In the second embodiment, the LED luminance system 100 is configured to periodically enable the short circuit protection controller 110 to periodically detect the voltage level of the second ends of the transistors T1 to TN only when the second switches SW2_1 to SW2_N are all on. According to the configuration of the second embodiment, the LED luminance system 100 need not continuously enable the short circuit protection controller 110, thus the power consumption of the LED luminance system 100 can be further saved.

It can be seen from FIG. 5 that, the first switch SW1 is turned off during the period that the second switches SW2_1 to SW2_N are turned on. Besides, in the embodiments of the present invention, turning on the second switches SW2_1 to SW2_N comprises synchronously and asynchronously turning on the second switches SW2_1 to SW2_N. For example, the second switches SW2_1 to SW2_N can be respectively turned on in sequence or in a random manner.

According to the present embodiments, the LED luminance system 100 can provide SCP function when the LEDs 35 of the LED luminance system 100 are damaged or breakdown, thus increasing the life span of the LED luminance system 100. Besides, the selecting circuit 70 of the LED luminance system 100 can select a smallest voltage level from the voltage levels VS1 to VSN at the second ends of the transistors T1 to TN, to adjust the voltage outputted to the LED strings 30_1 to 30_N, thus further increasing the life span of the LED luminance system 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting diode luminance system, comprising:
    a first power source for providing a first voltage;
    a voltage divider coupled to the first voltage source;
    a first switch coupled to the voltage divider and a ground;
    a clamping device comprising a plurality of transistors, each transistor of the plurality of transistors having a first end respectively coupled to a second end of each of a plurality sets of light emitting diodes, a control end coupled to the voltage divider, and a second end;
    a plurality of current sources respectively coupled to the second end of each of the plurality of transistors; and
    a feedback circuit coupled to the second end of each of the plurality of transistors, and coupled to a first end of each of the plurality sets of light emitting diodes.

2. The light emitting diode luminance system of claim 1, further comprising a clamping circuit coupled to the control ends of the transistors.

3. The light emitting diode luminance system of claim 1, wherein the feedback circuit comprises:
    a selection circuit coupled to the second end of each of the transistors, for outputting a smallest voltage among voltages of each of the second end of the transistors;
    a comparator, comprising:
        a positive input end coupled to the selection circuit;
        a negative input end for receiving a reference voltage; and
        an output end for outputting a comparison signal according to a voltage level outputted from the selection circuit and the reference voltage; and
    a converter, coupled to the first end of each of the plurality sets of light emitting diodes and the output end of the comparator, for adjusting voltage levels being outputted to the plurality sets of light emitting diodes according to the comparison signal.

4. The light emitting diode luminance system of claim 1, further comprising:
    a plurality of second switches, respectively coupled to the current sources; and
    a short circuit protection controller, comprising:
        a plurality of input ends, respectively coupled to the second end of each of the transistors; and
        a plurality of output ends, respectively coupled to a control end of each of the second switches, for turning on and off the second switches according to a voltage level of the second end of each of the transistors or dimming signals.

5. The light emitting diode luminance system of claim 1, wherein the voltage divider comprises:
    a first impedance coupled to the first voltage source; and
    a second impedance coupled between the first impedance and the ground.

6. The light emitting diode luminance system of claim 2, wherein the clamping circuit comprises:
    a zener diode, comprising a cathode coupled to the control end of each of the transistors, and an anode coupled to the ground.

7. A method of controlling a light emitting diode luminance system, the light emitting diode luminance system comprising a first power source, a voltage divider, a first switch, a clamping device, a plurality of current sources and a feedback circuit, the first power source being used for providing a first voltage, the voltage divider being coupled to the first voltage source,
    the first switch being coupled to the voltage divider and a ground, the clamping device comprising a plurality of transistors, each transistor of the plurality of transistors having a first end respectively coupled to a second end of each of a plurality sets of light emitting diodes, a control end coupled to the voltage divider, and a second end, the plurality of current sources respectively being coupled to the second end of each of the plurality of transistors, and the feedback circuit being coupled to the second end of each of the plurality of transistors and coupled to a first end of each of the plurality sets of light emitting diodes, the method comprising:
    turning on the first switch for the voltage divider outputting a divided voltage to the control end of each of the transistors;
    turning off the first switch; and
    enabling the short circuit protection controller for detecting a voltage level of the second end of each of the plurality of transistors;
    wherein a period of the short circuit protection controller being enabled and a period of the first switch being turned off are at least partially overlapped.

8. The method of claim 7, wherein the light emitting diode luminance system further comprises a clamping circuit coupled to the control ends of the transistors, wherein when the first switch is turned off, the voltage divider outputs a lowest voltage among a first voltage outputted from the first voltage source and a clamping voltage outputted from the clamping circuit, to control the transistors.

9. The method of claim 7, further comprising the short circuit protection controller turning off at least one of the second switches according to the voltage level of the second end of each of the transistors.

10. The method of claim 7, wherein the first switch is at a turned on state while the second switch is at a turned off state.

11. The method of claim 7, further comprising not synchronously turning on and off the second switches, wherein the first switch is turned off only when the second switches are turned on.

12. The method of claim 11, wherein not synchronously turning on and off the second switches is sequentially turning on and off the second switches.

13. The method of claim 7, wherein when the second switches are turned on, the short circuit protection circuit is periodically enabled, to periodically detect the voltage level of the second end of the transistors.

14. The method of claim 7, wherein the feedback circuit comprises a selection circuit, a comparator and a converter, the selection circuit being coupled to the second end of each of the transistors, the comparator comprises a positive input end coupled to the selection circuit, a negative input end for receiving a reference voltage, and an output end, the converter being coupled to the first end of each of the plurality sets of light emitting diodes and the output end of the comparator, the method further comprising:
    the selection circuit outputting a smallest voltage among voltages of each of the second end of the transistors;
    the comparator outputting a comparison signal according to a voltage level outputted from the selection circuit and the reference voltage;

the converter adjusting voltage levels being outputted to the first end of each of the plurality sets of light emitting diodes according to the comparison signal.

\* \* \* \* \*